United States Patent [19]
Ito

[11] Patent Number: 5,458,426
[45] Date of Patent: Oct. 17, 1995

[54] DOUBLE LOCKING CONNECTOR WITH FALLOUT PREVENTING PROTRUSION

[75] Inventor: Katsuya Ito, Yokkaichi, Japan

[73] Assignee: Sumitomo Wiring Systems, Ltd., Mie, Japan

[21] Appl. No.: 231,759

[22] Filed: Apr. 25, 1994

[30] Foreign Application Priority Data

Apr. 26, 1993 [JP] Japan .................. 5-027477 U

[51] Int. Cl.⁶ .................................................. H01R 13/08
[52] U.S. Cl. .................... 403/274; 403/277; 403/301; 403/315; 403/316; 403/326; 439/595; 439/741; 439/743; 439/870; 439/871
[58] Field of Search ............................. 439/595, 741, 439/743, 870, 871; 403/301, 326, 274, 277, 278, 279, 282, 319, 315, 316

[56] References Cited

U.S. PATENT DOCUMENTS

| | | | |
|---|---|---|---|
| 1,656,856 | 1/1928 | Gagnon | 439/741 |
| 2,691,771 | 10/1954 | Burtt et al. | 439/743 |
| 3,182,276 | 5/1965 | Ruehlemann | 439/741 X |
| 3,794,961 | 2/1974 | Bailey et al. | 439/741 X |
| 4,260,216 | 4/1981 | Ackerman | 439/743 X |
| 5,066,252 | 11/1991 | Kato et al. | 439/595 X |
| 5,224,883 | 7/1993 | Yamamoto | 439/595 X |
| 5,318,465 | 6/1994 | Boyle et al. | 439/741 |

FOREIGN PATENT DOCUMENTS

| | | | |
|---|---|---|---|
| 0207841 | 1/1987 | European Pat. Off. | 439/595 |
| 4310193 | 10/1993 | Germany | 439/871 |
| 6459787 | 3/1989 | Japan | 439/595 |
| 4-23391 | 4/1992 | Japan . | |
| 4-26190 | 5/1992 | Japan . | |

Primary Examiner—David H. Corgin
Assistant Examiner—Christopher J. Novosad
Attorney, Agent, or Firm—Oliff & Berridge

[57] ABSTRACT

A connector includes a connector housing and at least one metal terminal. The connector housing has at least one terminal accommodating hole for receiving the metal terminals, a primary locking device for elastically engaging with the metal terminals, at least one fallout preventing protrusion formed on the wall of the terminal accommodating holes, and at least one window for inserting a jig. The metal terminal includes a secondary locking device extended from the metal terminal, confronting with the window when the metal terminal is locked by the primary locking device while avoiding interference with the fallout preventing protrusion. The secondary locking device is adopted to be deformed by a jig inserted into the window to engage with the fallout preventing protrusion.

8 Claims, 4 Drawing Sheets

DOUBLE LOCKING CONNECTOR WITH FALLOUT PREVENTING PROTRUSION

BACKGROUND OF THE INVENTION

This invention relates to a double locking type connector.

A so-called "double locking system" of fixing a metal terminal inserted in a connector housing is well known in the art. In a connector of this system, a deformable elastic locking piece is provided in a terminal accommodating hole formed in the connector housing, to elastically engage with the metal terminal. After the metal terminal has been primarily locked in the above,described manner, a retainer is coupled to the connector housing so that it secondarily (finally) locks the metal terminal with its part protruded into the terminal accommodating hole. The retainer is provided as a component which is divided from the connector housing to be directly engaged with the connector housing, or it is coupled through a hinge to the connector housing.

The above-described conventional connector suffers from the following difficulties: The connector having the retainer as a divided component to be directly engaged with the connector housing has a relatively large number of components and is rather troublesome in handling and in maintenance. On the other hand, in the case of the connector having the retainer coupled through the hinge to the connector housing, the hinge may be broken during the use of the connector. In addition, the connector, which is relatively intricate in configuration as a whole, is rather difficult to form. For each of the connectors, the retainer is an essential component, which increases the manufacturing cost of the connector.

In view of the foregoing, an object of this invention is to provide a connector in which a metal terminal is positively secured with simple means, and which can be manufactured at lower cost.

SUMMARY OF THE INVENTION

The foregoing object of the invention has been achieved by the provision of a connector according to the present invention comprising a connector housing and at least one metal terminal. The connector housing comprises, at least one terminal accommodating hole for receiving the metal terminals, a primary locking device for elastically engaging with the metal terminals, at least one fallout preventing protrusion formed on the wall of the terminal accommodating holes, and at least one window for inserting a jig. The metal terminal comprises a secondary locking device extended from the metal terminal, confronting with the window when the metal terminal is locked by the primary locking device while avoiding interference with the fallout preventing protrusion, and deformed by a jig inserting into the window to engage with the fallout preventing protrusion.

When the metal terminal is inserted into the terminal accommodating hole of the connector housing, it is engaged with the primary locking device. In this operation, the secondary locking pieces are located at the window opened in the connector housing. Under this condition, the jig is inserted into the window, to deform the secondary locking pieces to cause the secondary locking pieces to engage with the protrusion of the metal terminal, as a result of which the metal terminal is secondarily locked to the connector housing.

The connector of the invention described above is advantageous in the following points: The metal terminal is prevented from coming off without using a retainer. That is, the fallout of the metal terminal is prevented by simply modifying the connector housing; i.e., merely by adding the fallout preventing protrusion and the window to it. Thus, the connector is simple in construction, and low in manufacturing cost.

DETAILED DESCRIPTION OF THE PREFERRED EMBODIMENTS

Figure 1:
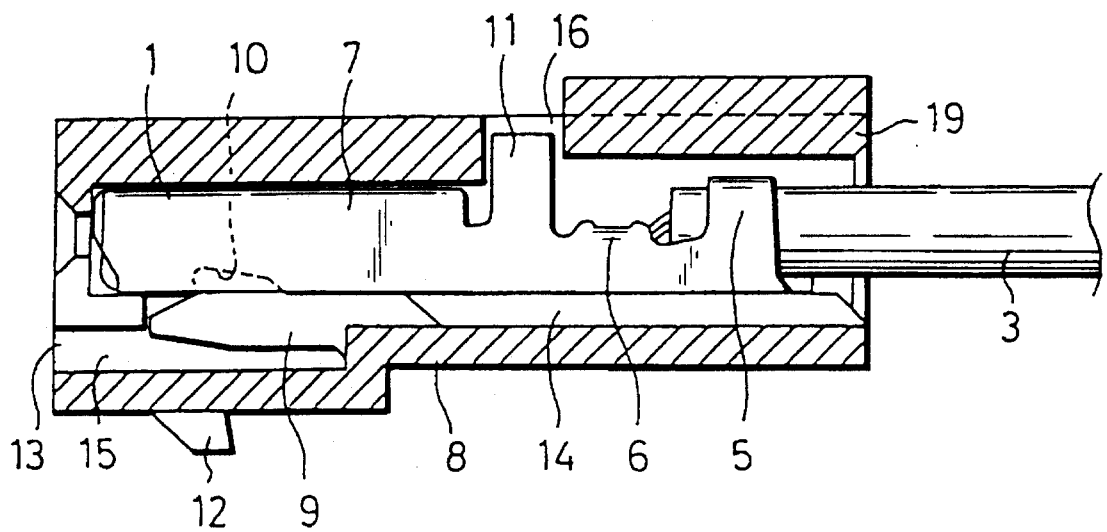
FIG. 1 is a sectional front view showing the insertion of a metal terminal in a first embodiment of the invention.

Preferred embodiments of this invention will be described with reference to the accompanying drawings. The embodiments are directed female connectors; however, it goes without saying that the technical concept of the invention may be applied to male connectors.

First, a metal terminal 1 employed in the connector according to the invention will be described. The metal terminal 1 is connected to an electrical cable 2 whose insulating cover 3 is removed at one end to expose core wires 4. The metal terminal 1 comprises first crimping portions 5 which are to be crimped against the outer surface of the insulating cover 3; second crimping portions 6 which are to be crimped against the core wires; and a terminal connecting portion 7 located ahead of the second crimping portions 6. The terminal connecting portion 7 is in the form of a rectangular tube, into which a metal terminal (not shown) of the mating male connector is inserted, thus accomplishing the electrical connection therebetween.

Figure 2:
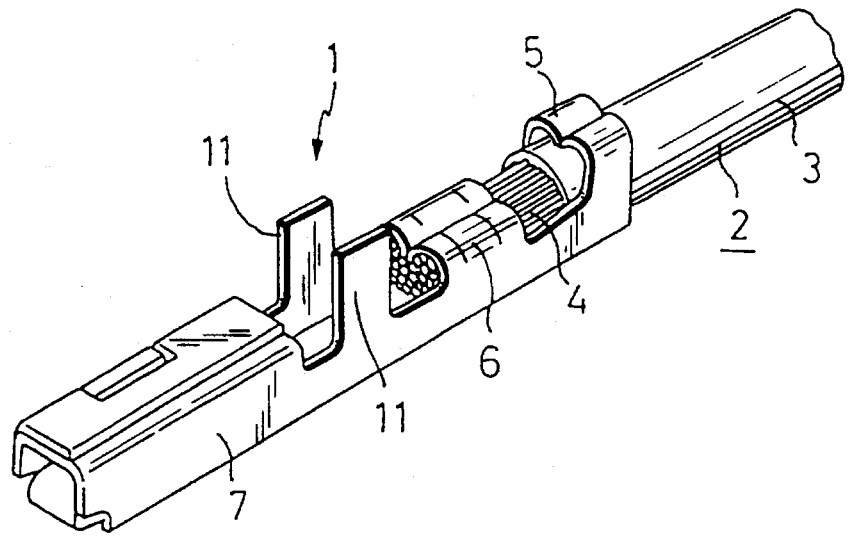
FIG 2 is a perspective view of the metal terminal.
Figure 3:
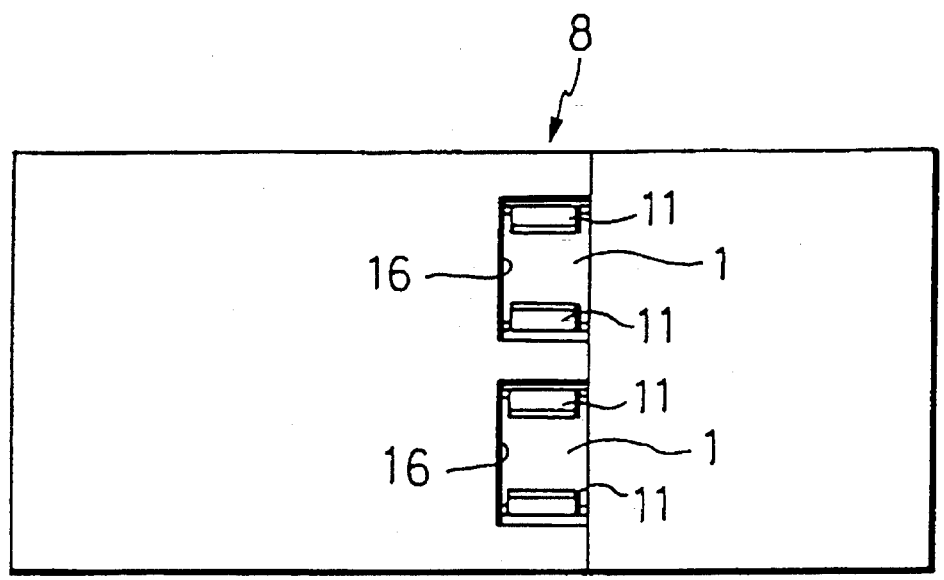
FIG. 3 is a plan view of a connector.
Figure 5:
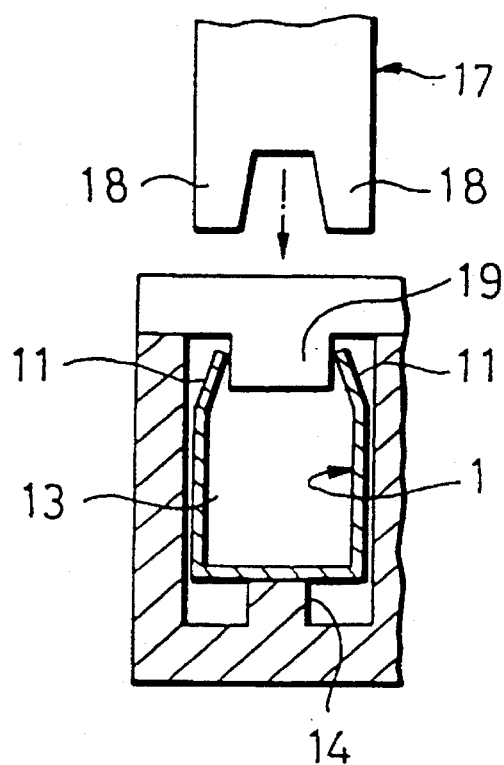
FIG. 5 is a sectional side view showing essential parts of the connector with the metal terminal being secondarily locked.

The terminal connecting portion 7 has a locking recess 10 in the bottom which is engageable with an elastic locking piece 9 of a connector housing 8 (described later). The metal terminal 1 further comprises a pair of secondary locking pieces 11 located between the terminal connecting portion 7 and the second crimping portions 6, and the secondary locking pieces 11 are extended upwardly (in FIGS. 1 and 2) from the body of the metal terminal. More specifically, the secondary locking pieces 11 are extended from both edges of the body of the metal terminal 1, and bent towards each other as shown in FIG. 5.

Figure 4:
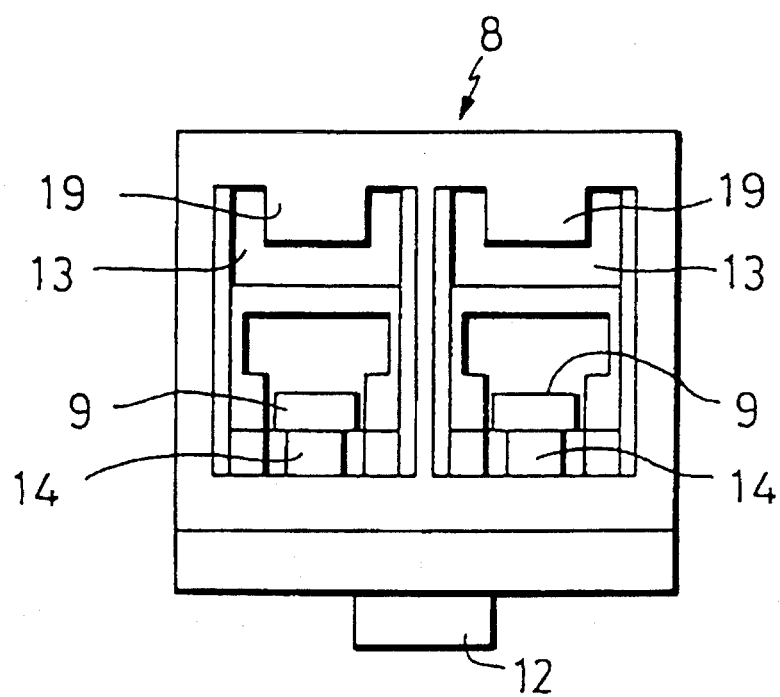
FIG. 4 is a side view of the connector.
Figure 6:
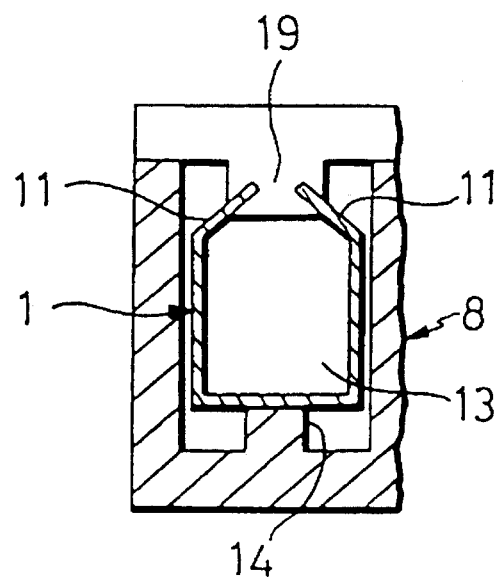
FIG. 6 is a sectional side view showing the essential parts of the connector with the metal terminal secondarily locked.

The housing of the female connector (hereinafter referred to merely as "a housing 8", when applicable) is formed by molding synthetic resin. The housing 8 has a locking protrusion 12 on its bottom, which engages with the housing of the male connector when the female connector is engaged with the male connector, to cause the female connector to be positively engaged with the male connector. The housing 8 has terminal accommodating holes 13 that longitudinally pass through the housing 8 so as to receive the metal terminals 1. In the embodiment as shown in FIG. 4, as shown in FIG. 4 the terminal accommodating holes 13 are arranged side by side. Each of the terminal accommodating holes 13 has a protruded strip 14 along the central line of the bottom to support the metal terminal 1. More specifically, the protruded strip 14 is extended inwardly from the inlet (the right open end in FIG. 1) of the terminal accommodating hole 13. The front end of the protruded strip 14 merges with an elastic locking piece (or primary locking means) 9 which is elastically engageable with the locking recess 10 of the metal terminal 1. In order to allow the elastic locking piece 9 to bend downwardly when the metal terminal 1 is inserted into the housing, the front end portion of the bottom of the terminal accommodating hole 13 which confronts with the elastic locking piece 9 is stepped downwardly as indicated at 15 (hereinafter referred to as "a step 15", when applicable). Windows 16 that communicate with the terminal accommodating holes 13, respectively, are formed in the upper wall of the connector housing 8. More specifically, the windows 16 are so positioned that they are located above the secondary locking pieces 11 when the metal terminals 1 have been inserted as much as required. In addition, each of the windows 16 is large enough to receive the pressing legs 18 of a jig 17 as shown in FIG. 5. That is, the lower end portion of the jig 17 is formed into the above-described pressing legs 18. The jig 17, being coupled to a lifting mechanism (not shown), is normally held above the connector housing 8. When the jig 17 is activated, the pressing legs 18 are pushed into the window 16 to deform the secondary locking pieces 11; i.e., to bend the secondary locking pieces 11 towards each other as shown in FIG. 6 (crimping the secondary locking pieces).

A fallout preventing protrusion 19 is provided in the upper portion of the terminal accommodating hole 13 in such a manner that it is extended from the inlet of the housing to the window 16. The width of the fallout preventing protrusion 19 is smaller than the distance between the secondary locking pieces 11 so that, when the metal terminal 1 is inserted into the terminal accommodating hole 13, the fallout preventing protrusion 19 may not interfere with the secondary locking pieces 11. When the secondary locking pieces 11 are bent inwardly as was described above, the fallout preventing protrusion 19 is engaged with the secondary locking pieces 11 thus bent, to prevent the metal terminal 1 from coming off the housing 8.

The functions and effects of the connector designed as described above will be described in detail.

First, with the terminal connecting portion 7 of the metal terminal 1 fitted in the terminal accommodating hole 13, the metal terminal 1 is pushed along the protruded strip 14 into the housing. In this operation, the secondary locking pieces 11 are held open as shown in FIG. 5; that is, they are spaced from each other as required, and therefore they will never interfere with the fallout preventing protrusion 19. That is, the insertion of the metal terminal is achieved smoothly. During the insertion of the metal terminal, the elastic locking piece 9 is bent towards the step 15; and when the metal terminal 1 has been inserted into the housing as much as required, the elastic locking piece 9 thus bent is restored to engage with the locking recess 10 of the metal terminal 1. Thus, the metal terminal 1 has been primarily locked.

When the metal terminal 1 has been primarily locked, the secondary locking pieces 11 are in alignment with the window 16 as was described before. Under this condition, the jig 17 is moved downwardly by the lifting mechanism (not shown), so that the pressing legs 18 of the jig 17 are pushed into the window 16 to bend the secondary locking pieces 11 towards each other until the distance between the end portions of the secondary locking pieces 11 becomes smaller than the width of the fallout preventing protrusion 19. Thus, the secondary locking pieces 11 are engaged with the fallout preventing protrusion 19, and the metal terminal 1 is secondarily locked to the connector housing 8.

As is apparent from the above description, the connector of the invention is advantageous in the following points: The metal terminal 1 is prevented from coming off without using a retainer. That is, the fallout of the metal terminal is prevented by simply modifying the connector housing; i.e., merely by adding the fallout preventing protrusion 19 and the window 16 to it. Thus, the connector is simple in construction, and low in manufacturing cost.

Figure 7:
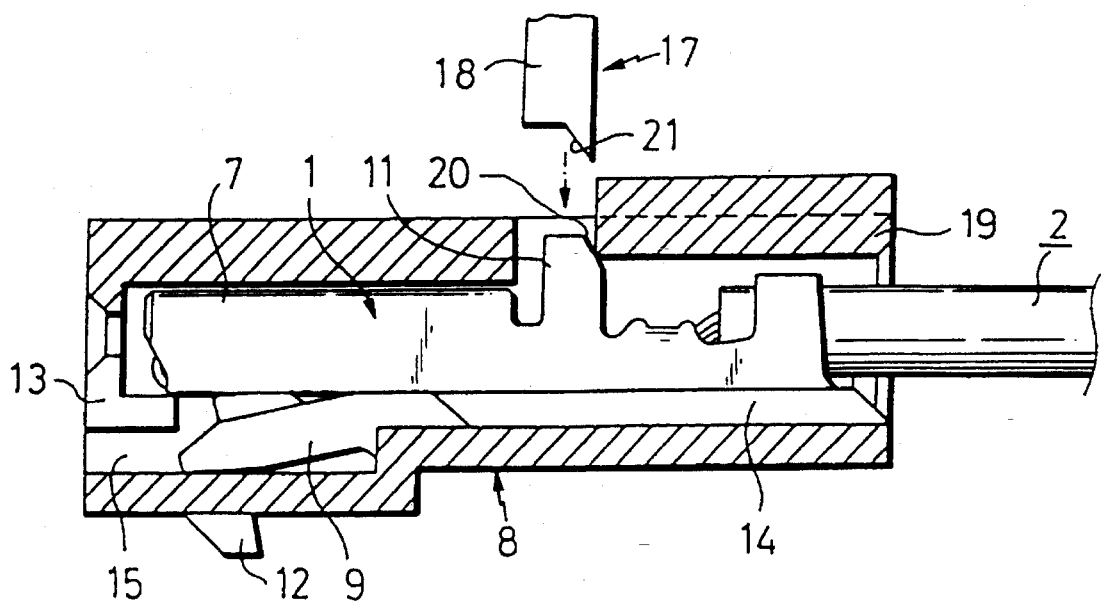
FIG. 7 is a sectional front view showing the insertion of a metal terminal in a second embodiment of the invention.

FIG. 7 shows a second embodiment of the invention. In the specific feature of the second embodiment, even if the insertion of the metal terminal 1 into the housing is insufficient, the metal terminal 1 is positioned in place while the secondary locking pieces 11 are being bent with the jig.

Each of the secondary locking pieces 11 of the metal terminal 1 has a sloped surface 20 at the top corner. On the other hand, the pressing legs 18 of a jig 7 have guide surfaces 21 which agree with the sloped surfaces 20 of the secondary locking pieces 11.

Hence, even when the metal terminal 1 is insufficiently inserted into the housing as shown in FIG. 7, it is moved to position in place as follows: When the pressing legs 18 of the jig are pushed into the window 16, a force is applied to the metal terminal to move the metal terminal forwardly to the predetermined position while the guide surfaces 20 are slid down the sloped surfaces 21. That is, in the second embodiment, the crimping motion of the jig 17 is utilized to shift the metal terminal 1 to the predetermined position when the metal terminal has been insufficiently inserted into the connector housing. Thus, with the second embodiment, the metal terminal 1 can be more smoothly fixed in position.

Figure 8:
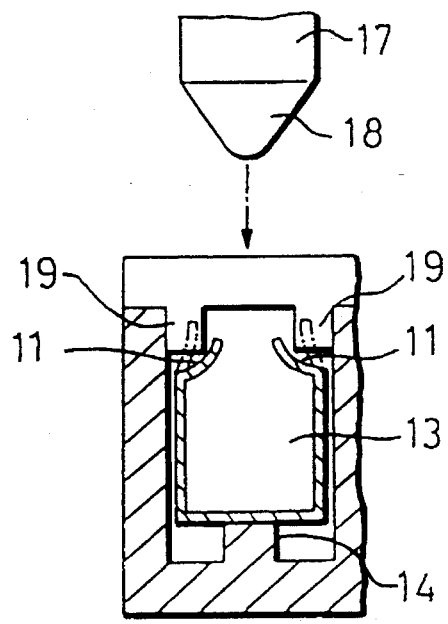
FIG. 8 is a sectional side view showing essential components of a third embodiment of the invention.

FIG. 8 shows a third embodiment of the invention. In each of the first and second embodiments, the secondary locking pieces 11 are bent towards each other to engage with the fallout preventing protrusion 19. On the other hand, in the third embodiment, the secondary locking pieces 11 are bent away from each other. As shown in FIG. 8, fallout preventing protrusions 19 are arranged in the upper right and left portion terminal accommodating hole 13, thus forming a recess therebetween. The secondary locking pieces 11 are bent towards each other and curved downwardly so that they normally do not interfere with the fallout preventing protrusions 19. On the other hand, the jig 17 has a pressing leg 18 which is tapered so that it may go into the space between the secondary locking pieces 11. Hence, when the pressing leg 18 is inserted between the secondary locking pieces 11, the secondary locking pieces 11 are deformed by the pressing leg 18 being spaced away from each other, thus engaging with the fallout preventing protrusion 19.

The other arrangement is the same as that in the first embodiment, and the effects are also the same as those in the first embodiment.

In the above-described embodiments, the primary locking means is the elastic locking piece 9 which is provided on the side of the housing 8; however, it may be provided on the side of the metal terminal. Furthermore, the electrical cable 2 may be electrically connected to the jig 17, so that while the secondary locking pieces 11 are being deformed as was described above, a conduction test may be performed to determine whether or not the metal terminal has been connected to the core wires 4 as required.

What is claimed is:

1. A connector comprising:

a connector housing; and at least one metal terminal, said connector housing comprising:

at least one terminal accommodating hole for receiving said at least one metal terminal;

primary locking means for elastically engaging with said at least one metal terminal;

at least one fallout preventing protrusion formed on a wall of said at least one terminal accommodating hole; and at least one window for inserting a jig, said metal terminal comprising;

secondary locking means extended from said metal terminal, confronting said window when said metal terminal is locked by said primary locking means while avoiding interference with said fallout preventing protrusion, said secondary locking means being deformed by a jig inserted into said window such that said fallout preventing protrusion prevents removal of said metal terminal.

2. A connector according to claim 1, wherein said secondary locking means comprises a pair of secondary locking pieces, said fallout preventing protrusion is arranged within the at least one terminal accommodating hole, and the width of said fallout preventing protrusion is smaller than the distance prior to insertion of the jig between said secondary locking pieces of said at least one metal terminal.

3. A connector according to claim 2, wherein each of the secondary locking pieces has a sloped surface at a top corner, and said jig has guide surfaces which agree with said sloped surfaces of the secondary locking pieces.

4. A connector according to claim 2, wherein the jig includes two spaced pressing legs.

5. A connector according to claim 1, wherein said secondary locking means comprises a pair of secondary locking pieces, said fallout preventing protrusion comprises a pair of protrusions which are separated from each other and formed on either side corner of said at least one terminal accommodating hole, and the width between a pair of said fallout preventing protrusions is larger than the distance prior to insertion of the jig between said secondary locking pieces of the at least one metal terminal.

6. A connector according to claim 5, wherein the jig includes a tapered pressing leg.

7. A connector according to claim 1, wherein said secondary locking means comprises a pair of secondary locking pieces, each of the secondary locking pieces has a sloped surface at a top corner, and said jig has guide surfaces which agree with said sloped surfaces of the secondary locking pieces.

8. A connector according to claim 7, wherein the jig includes two spaced pressing legs.

\* \* \* \* \*